United States Patent [19]
Bacon

[11] Patent Number: 5,835,254
[45] Date of Patent: Nov. 10, 1998

[54] MOUNTING ASSEMBLY FOR MODULATORS

[75] Inventor: Wesley Howard Bacon, Rochester, N.Y.

[73] Assignee: Eastman Kodak Company, Rochester, N.Y.

[21] Appl. No.: 633,091

[22] Filed: Apr. 16, 1996

[51] Int. Cl.⁶ .................................................. G02F 1/03
[52] U.S. Cl. ............................................. 359/254; 349/58
[58] Field of Search ........................... 349/58, 139, 140, 349/141, 142; 359/247, 254, 259, 323

[56] References Cited

U.S. PATENT DOCUMENTS

| | | | |
|---|---|---|---|
| 3,786,375 | 1/1974 | Sato et al. | 333/84 |
| 4,458,291 | 7/1984 | Yanagisawa et al. | 361/212 |
| 4,864,724 | 9/1989 | Bergstroni | 29/854 |
| 5,206,713 | 4/1993 | McGeary | 257/684 |
| 5,233,746 | 6/1993 | Abe et al. | 257/678 |
| 5,377,032 | 12/1994 | Fergason et al. | 359/62 |

*Primary Examiner*—David C. Nelms
*Assistant Examiner*—Dawn-Marie Bey
*Attorney, Agent, or Firm*—Nelson Adrian Blish

[57] ABSTRACT

A mounting assembly (50) for an electro-optic modulator array (10) is disclosed. Electro-optic modulator array (10) is mounted on a ledge (52) of wiring board (53). A recess (51) in wiring board (53) allows electrical connection of electrodes (14,15) from both a first surface of electro-optic modulator array (10) to a first side of wiring board (53), and from a second surface of electro-optic modulator array (10) to a second side of wiring board (53). A resilient adhesive (54) is used to attach electro-optic modulator array (10) to board (53). Wiring electro-optic modulator array (10) to both sides of wiring board (53) allows full utilization of the PLZT substrate and hence, higher light beam density per unit length.

9 Claims, 5 Drawing Sheets

5,835,254

MOUNTING ASSEMBLY FOR MODULATORS

BACKGROUND OF THE INVENTION

1. Field of the Invention

The present invention relates to a mounting assembly for electro-optic modulator arrays having electrical connections on both sides, for higher image density in the same modulator length.

2. Description of the Prior Art

An array of electro-optic modulators is often used to control transmission of beams of light used to print images. Electro-optic materials employed in individual modulators have properties which change in accordance with the strength of an electrical field established within the material. A material typically used is lanthanum doped lead zirconate titanate, referred to as PLZT.

Electro-optic modulators are usually manufactured in a group or array. In these arrays, each electro-optic modulator must be spaced from the adjacent modulator in order to minimize electrical and optical cross talk. This leads to unused portions of the electro-optic material. PLZT is expensive, and unused portions add unnecessary cost.

An improved modulator design is the ridge modulator, in which two grooves are cut into the PLZT material, and electrodes are metallized around these grooves to form a structure which resembles a capacitor. This provides an aperture, an area without surface electrodes, which transmits light. The ridge modulator can be readily extended to form a linear array of modulators. To minimize both electrical and optical cross-talk between adjacent light beams, a gap between the electrodes is still required. The solution to this problem led to the development of a double-sided ridge modulator. Use of a double-sided ridge modulator, however, led to additional problems because the electro-optic modulator array must be connected to both sides of a wiring board.

SUMMARY OF THE INVENTION

The object of the invention is to provide a mounting assembly for an electro-optic modulator array in which both surfaces of the modulator array are electrically connected to both sides of a wiring board. The modulator array is mounted in a recess on a printed wiring board, open to both a first side and a second side of the wiring board, using a resilient adhesive. Electrical connections on a first surface of the modulator array are electrically connected to the first side of the printed wiring board, and electrical connections on a second surface of the modulator array are electrically connected to the second side of the wiring board.

DETAILED DESCRIPTION OF THE PREFERRED EMBODIMENT

Figure 1:
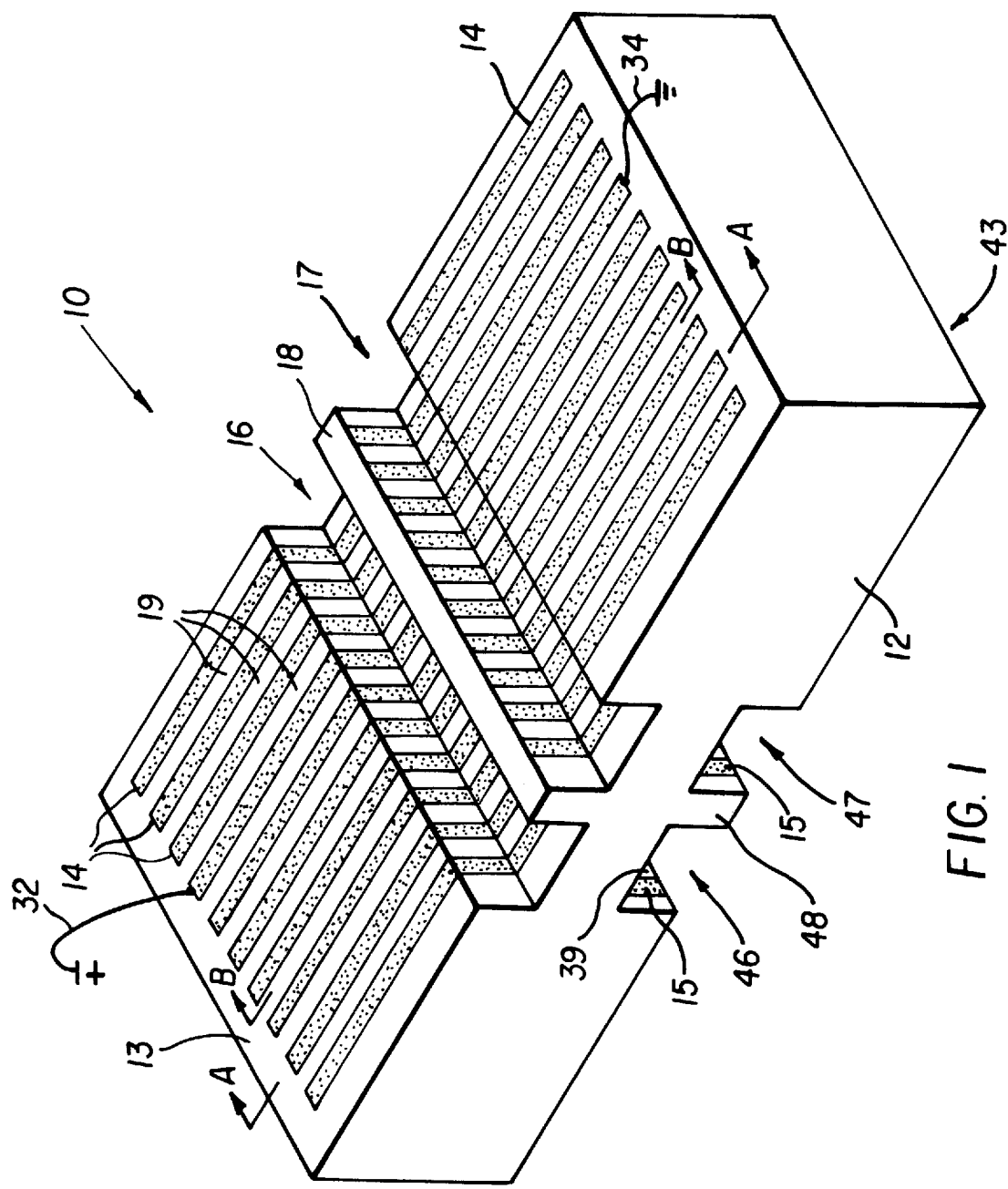
FIG. 1 is a perspective view of an electro-optic modulator array according to the present invention.

FIG. 1 shows an electro-optic modulator array, referred to in general by the numeral 10. Electro-optic modulator array 10 is constructed on a PLZT substrate 12.

A first surface 13 of substrate 12 has grooves 16 and 17, forming a first ridge 18. In a similar manner, second surface 43 of substrate 12 has grooves 46 and 47, forming a second ridge 48.

Figure 2:
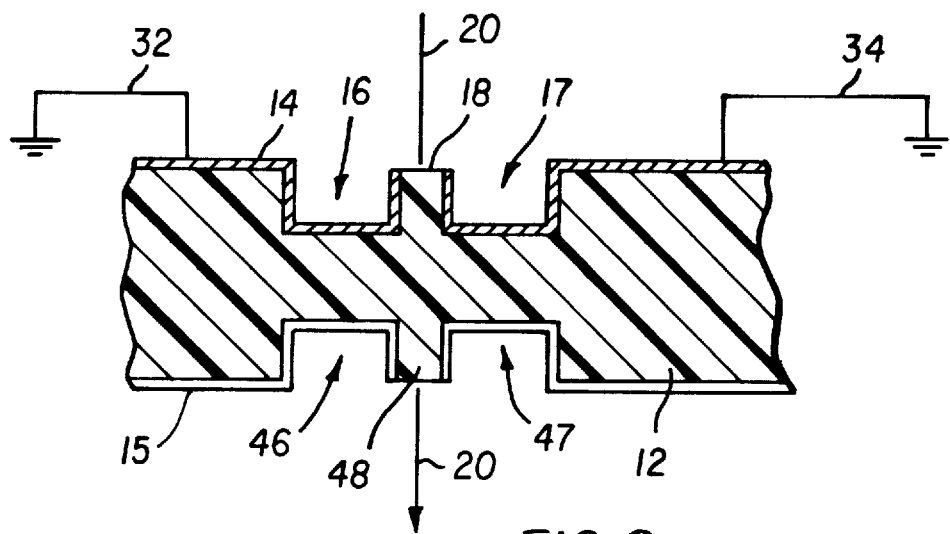
FIG. 2 is a cross-sectional view along line A—A of the electro-optic modulator array shown in FIG. 1.

First electrode pairs 14 are plated on the first surface of substrate 12 and in grooves 16 and 17. Gaps 19 separate first electrode pairs. Electrodes may be aluminum, silver, gold, or other conductive materials. The electrodes may also be layers of these materials. To facilitate adhesion of the metal electrodes to the PLZT, other material such as chrome, tantalum and titanium may be used. The preferred embodiment uses layers of chrome, aluminum, titanium and gold, applied in that order. The layer of gold provides good reflectivity for near infrared radiation, which minimizes the power loss due to electrode blocking. Electrode blocking is incident light which is absorbed by the electrodes when the modulator array is used with a near infrared laser diode source. For an alternate embodiment using a visible light modulator, silver is used as a top layer. A single layer of one material, such as aluminum, may be used. For convenience, each electrode pair 14 is shown in the drawing as being a single layer of one metal. The thickness of electrode pairs 14, shown in more detail in FIG. 2, are on the order of 0.5 to 4.0 microns.

First ridge 18 forms an area between electrode pairs 14. An electric field is established across ridge 18 by an electric circuit through first wires 32 and 34 and first electrode pairs 14. Each first electrode pair 14 is individually connected to a wiring lead as discussed in more detail below. Although all electrode pairs are individually connected, only one connection is shown in FIGS. 1 and 2, for convenience.

Figure 3:
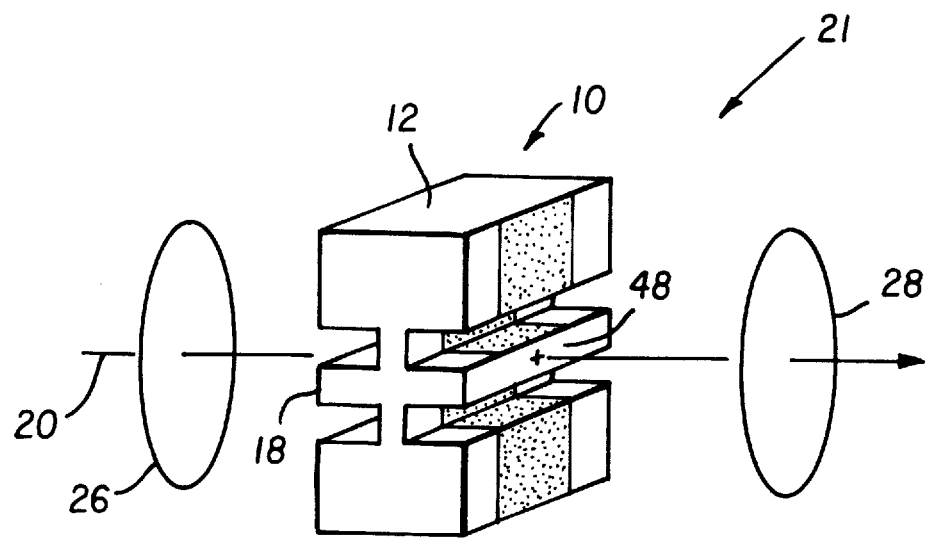
FIG. 3 is a schematic view of an electro-optic modulator assembly.

FIG. 3 shows in schematic how an electro-optic modulator array 10 would be used in a modulator assembly 21. A light beam 20 from a source strikes a first polarizer 26. In actual operation, a series of light beams, in parallel to each other, would strike first ridge 18, on the first surface of array 10. A laser diode array is used as a light source in the preferred embodiment. However, a tungsten halogen lamp or other suitable light sources may also be used. With electrodes off, that is without voltage applied across ridge 18, polarized light passes through the modulator array 10. Polarizer 28, which is oriented approximately 90° from polarizer 26, prevents transmission of light beam 20 through modulator assembly 21. When the first electrode pairs 14 are energized, light beam 20 is phase shifted and aligned with the polarization axis of second polarizer 28, allowing the light beam to pass through modulator assembly 21.

Figure 4:
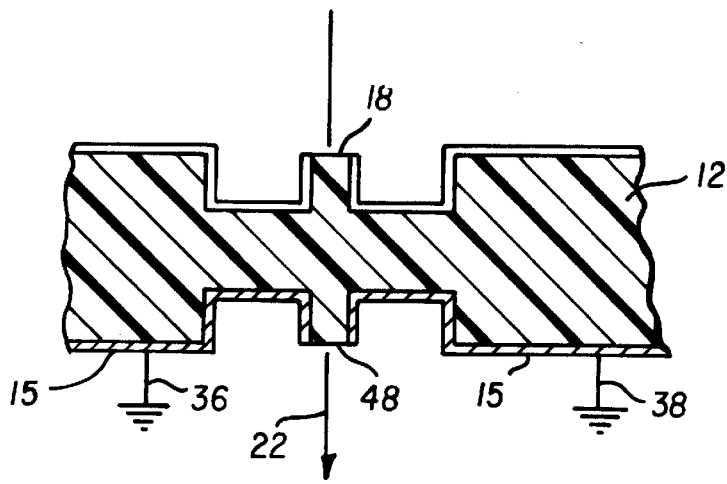
FIG. 4 is a cross-sectional view along line B—B of the array shown in FIG. 1.
Figure 5:
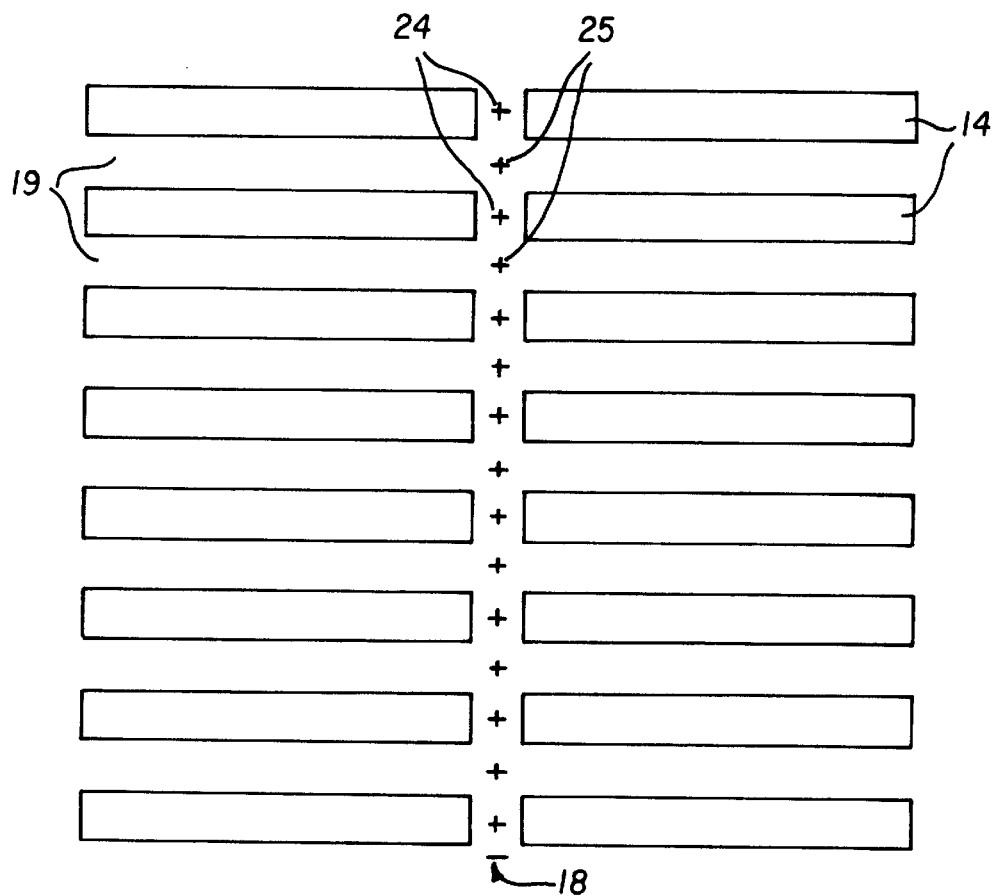
FIG. 5 is a top plan view of an electro-optic modulator array.

A second circuit, shown in FIG. 4, is established by second wires 36 and 38 connected to a circuit on a wiring board, discussed in more detail below. Gaps 39, shown in FIG. 1, separate second electrode pairs 15. Second electrode pairs 15 are arranged in a staggered fashion with electrode pairs 14 on the first surface 13, so that light beams 25, shown schematically in FIG. 5, and controlled by second electrode pairs 15, are adjacent to light beams 24, controlled by electrode pairs 14. FIG. 5 shows a top plan view of modulator array 10 showing the staggered array of beams 24 and 25. Thus, each area of the ridge 18 is used, cutting down on cost for excess, unused material. There are no gaps between light beams 24 and 25.

Figure 6A:
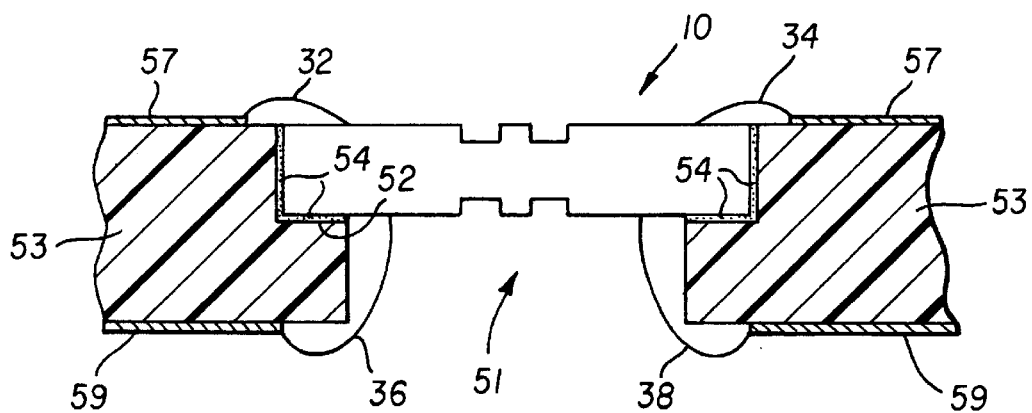
FIG. 6A is a cross-sectional view of an electro-optic modulator array mounted in a wiring board.
Figure 6B:
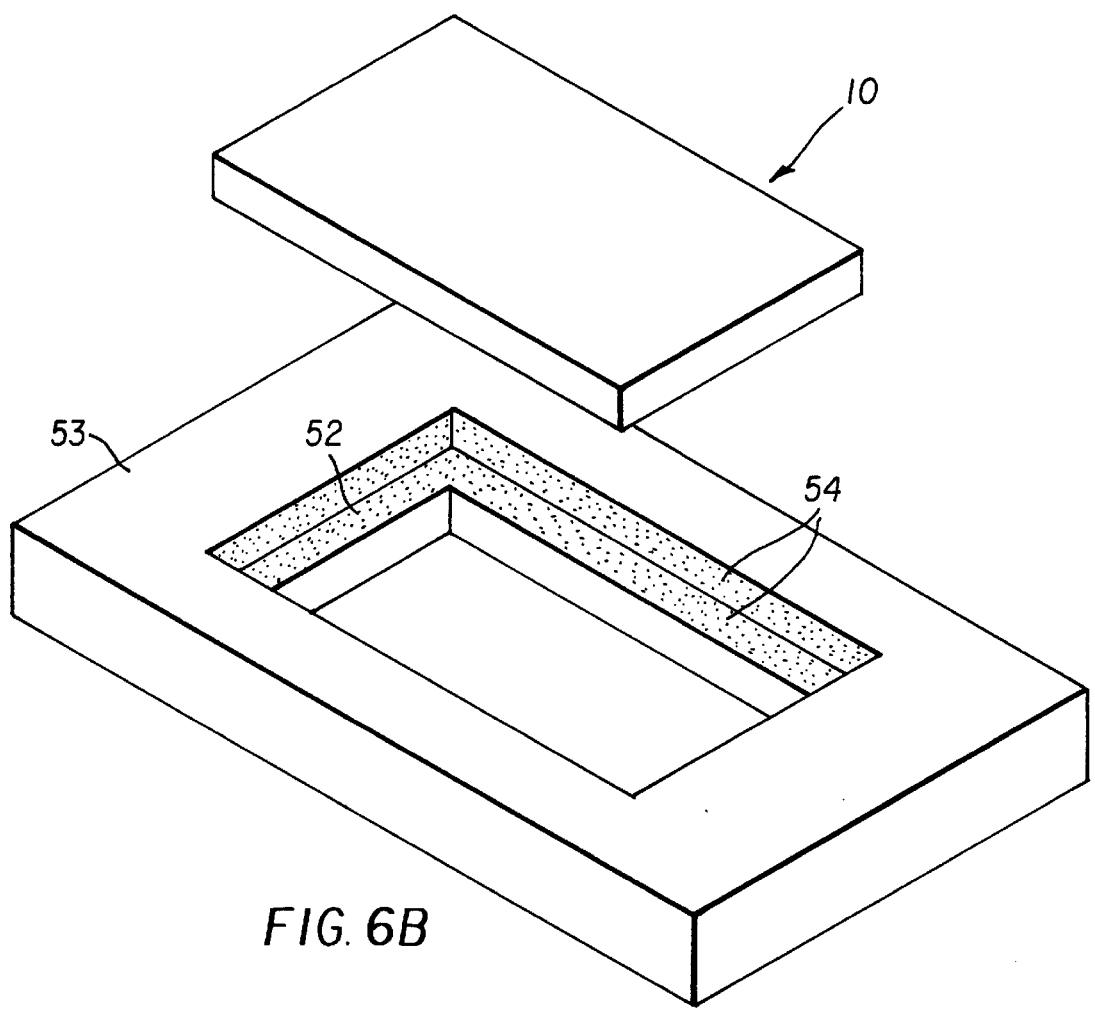
FIG. 6B is a perspective, exploded view of an electro-optic modulator mounting assembly.
Figure 7:
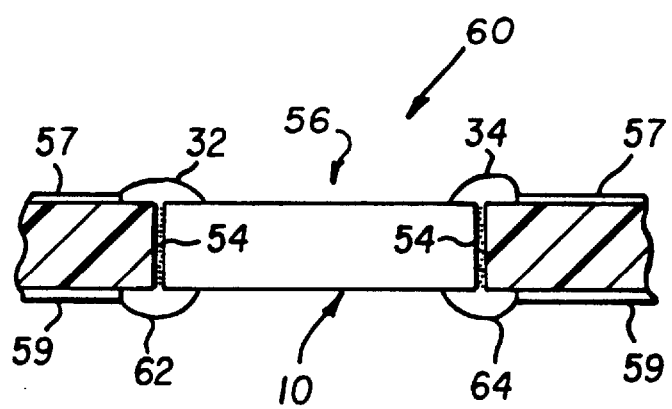
FIG. 7 is a cross-sectional view of an alternate embodiment of a mounting assembly for an electro-optic modulator array.

FIGS. 6A and 6B show a mounting assembly 50 for electro-optic modulator array 10. Array 10 is mounted on a ledge 52 of printed wiring board 53. In the preferred embodiment, wiring board 53 has printed circuits, but the scope of the invention is intended to cover various types of wiring boards. In the preferred embodiment, wiring board 53 is a composite of fiberglas and epoxy. Other material that may be used for wiring boards include polyamide, Mylar, ceramic, or co-fired ceramic.

Wiring board 53 and array 10 are attached to each other using adhesive 54. Adhesive 54 is a resilient material, such as a silicone adhesive or flexible epoxy. These adhesives should have some elasticity since any mechanical strain on array 10 changes the optical properties of the PLZT substrate. Acceptable hardness values for adhesives, should be on the order of 25 to 100 Shore A.

First wires 32 and 34 connect array 10 to a first electric circuit 57 on the first side of printed wiring board 53. In a similar manner, second wires 36 and 38 connect electro-optic modulator array 10 to second electric circuit 59 on a second side of printed wiring board 53. These wires are attached by ultrasonic wire bonding in the preferred embodiment.

Recess 51, cut into wiring board 53, allows transmission of light between the first side and the second side of wiring board 53. Thus, light beams pass through mounting assembly 50 and wiring board 53.

FIG. 8 shows an alternate embodiment 60 of a mounting assembly according to the present invention. In this embodiment, electro-optic modulator array 10 is flush mounted in a opening 56 in wiring board 53. A resilient adhesive 54 is used to attach array 10 to wiring board 53. First wires 32 and 34 connect to first circuit 57 and second wires 36 and 38 connect to second circuit 59, as described above.

An advantage to a double-sided electro-optic modulator is that the adjacent electrodes are on opposite sides of the substrate. This essentially eliminates electrical cross talk between electrodes controlling adjacent light beams. The next nearest electrode on the same side of the substrate is separated by one light beam. There may be slight optical cross talk depending on the pitch. Any electrical cross talk will be less than that achieved by moving the light beams closer together on a single-sided modulator array, which is the only option to increase the fill factor of a single-side modulator array. A mounting assembly, as disclosed in the present invention, allows full utilization of a double-sided electro-optic modulator array.

What is claimed is:

1. A mounting assembly for an electro-optic modulator array comprising:

a wiring board having a recess, open to a first side and to a second side of said wiring board;

an electro-optic modulator array, having a plurality of first electrode pairs on a first surface and a plurality of second electrode pairs on a second surface;

first wires connecting each electrode pair of said first electrode pairs to a first electrical circuit on said first side of said wiring board; and second wires connecting each electrode pair of said second electrode pairs to a second electrical circuit on said second side of said wiring board.

2. A mounting assembly as in claim 1 wherein said electro-optic modulator array is a double-sided electro-optic modulator array.

3. A mounting assembly as in claim 2 wherein said double-sided electro-optic modulator array has a ridge on said first surface and a ridge on said second surface.

4. A mounting assembly as in claim 1 wherein:

said recess has a ledge; and said second surface of said electro-optic modulator array rests on said ledge.

5. A mounting assembly as in claim 1 wherein said wiring board is attached to said electro-optic modulator array by a resilient adhesive.

6. A mounting assembly as in claim 5 wherein said adhesive is silicone.

7. A mounting assembly as in claim 5 wherein said adhesive is epoxy.

8. A mounting assembly as in claim 5 wherein said adhesive has a hardness between 25 and 100 Shore A.

9. A mounting assembly as in claim 1 wherein said wiring board is a fiberglas epoxy composite.

* * * * *

UNITED STATES PATENT AND TRADEMARK OFFICE
CERTIFICATE OF CORRECTION

PATENT NO. : 5,835,254
DATED : November 10, 1998
INVENTOR(S) : Wesley H. Bacon

It is certified that error appears in the above-identified patent and that said Letters Patent is hereby corrected as shown below:

Title Page  Add -- Provisional application No. 60/003,326 Sept. 6, 1995 --
Related U.S.
Application Data
Item[63]

```
Column 1, line 2, insert the following:
--CROSS REFERENCE TO RELATED APPLICATION
   Reference is made to and priority claimed from U.S. Provisional
   Application Ser. No.:  US 60/003,326, filed Sep. 6, 1995,
   entitled MOUNTING ASSEMBLY FOR MODULATORS.--.
```

Signed and Sealed this

Thirty-first Day of August, 1999

*Attest:*

Q. TODD DICKINSON

*Attesting Officer*  *Acting Commissioner of Patents and Trademarks*